United States Patent

Behr et al.

[15] 3,683,273

[45] Aug. 8, 1972

[54] METHOD AND APPARATUS FOR MEASURING FLUID FILM BEARINGS

[72] Inventors: Michael I. Behr, Pasadena; Robert A. Smith, Newbury Park, both of Calif.

[73] Assignee: Burroughs Corporation, Detroit, Mich.

[22] Filed: Feb. 27, 1970

[21] Appl. No.: 15,051

[52] U.S. Cl............................324/34 R, 179/100.2 B

[51] Int. Cl. ..............................................G01r 33/00

[58] Field of Search.........324/34, 34 T; 179/100.2 B, 179/100.2 T; 340/174.1 F

[56] References Cited

UNITED STATES PATENTS

| | | | |
|---|---|---|---|
| 2,914,746 | 11/1959 | James | 179/100.2 T |
| 3,445,608 | 5/1969 | Kinjo et al. | 179/100.2 T |
| 2,870,430 | 1/1959 | Hancock | 179/100.2 B |
| 2,922,106 | 1/1960 | Oates et al. | 324/34 TA |

FOREIGN PATENTS OR APPLICATIONS

| | | | |
|---|---|---|---|
| 229,820 | 2/1969 | U.S.S.R. | 340/174.1 F |

OTHER PUBLICATIONS

High- Capacity Magnetic Memory; Electronic Design; Jan. 1955; pp. 32- 33.

Cronquist, D. H.; Rotating Recording Head; IBM Tech. Discl. Bull.; Vol. 4, No. 3, August 1961; pp. 13-14.

*Primary Examiner*—Robert J. Corcoran
*Attorney*—Christie, Parker & Hale

[57] ABSTRACT

A technique particularly useful for measuring the flying characteristics of a magnetic recording head on an air bearing adjacent a rotating disk is described. According to this technique one of a plurality of magnetic transducers mounted in the moving disk records a line of signals of known amplitude and wavelength on a magnetic recording surface placed on the recording head being evaluated. The signal amplitude is read from this line of recorded signals as the disk rotates, and the relative spacing between the head and disk at two points on the head is determined from the relative amplitudes of the signals from the two points. In this way, the pitch, roll and deformation of the recording head can be measured in a dynamic situation.

11 Claims, 5 Drawing Figures

INVENTORS.
MICHAEL I. BEHR
ROBERT A. SMITH
BY
Christie, Parker & Hale
ATTORNEYS

METHOD AND APPARATUS FOR MEASURING FLUID FILM BEARINGS

BACKGROUND

In recent years magnetic recording disks have been employed as peripheral equipment with computers for transient storage of digital data. Such a disk memory system typically has a rapidly rotating disk in the order of 1 to 3 feet in diameter on the surfaces of which is a magnetic recording medium, such as a ferrite coating or deposited alloy film.

In order to record data on the rapidly rotating disk, a plurality of magnetic transducers are assembled in what is commonly known as a recording head and a plurality of such recording heads are arrayed adjacent the faces of the disk for recording on the surface. Since the disk is continuously rotating at high speed during operation of the memory system, it is impractical to have the recording heads in contact with the disk surface since rapid wear would be encountered. The magnetic recording heads are therefore supported adjacent the disk on a fluid film or air bearing which naturally develops between the rapidly moving disk and a properly designed stationary recording head. The air bearing is formed by a thin film of air swept into the gap between the disk and recording head as the disk moves. The film of air exerts a pressure on the magnetic recording head for maintaining the head at a selected distance away from the surface of the disk. In modern magnetic memory disk systems, the air bearing between a recording head and disk is in the order of about 100 microinches or less, that is, the face of the recording head is 100 microinches from the disk surface.

The ability of a recording transducer to record and read information on the magnetic material on the surface of the disk depends on several factors, an important one of which is the spacing between the transducer and the recording medium. The maximum "read" or output signal is obtained when the transducer is in contact with the magnetic recording medium as is usually the case in tape recorders; however, as the spacing between the transducer and the recording medium increases, the read signal strength falls off exponentially. It is, therefore, desirable to maintain as close a spacing between the transducer and the rotating disk as is feasible. In order to achieve such close spacing, sophisticated designs of the surfaces on the magnetic recording head have been employed in order to establish a stable air film, and special arrangements are made for supporting the recording head to hold it adjacent the disk surface.

When a disk is stopped or moving slowly, the recording head is normally retracted so as to not contact the disk surface when there is no air bearing present. After a disk is brought to rotating speed, it is then necessary to advance the recording head to a position adjacent the disk to establish an air bearing therebetween. It is found that care must be taken in the rate and angle of approach of the recording head to the moving disk when the air bearing is first established in order to prevent the recording head from crashing into the disk. In conventional terminology, the initial establishment of the air bearing between the head and disk is known as "landing," even though when the system is in stable operation the head is considered to be "flying" adjacent the surface of the disk.

The mechanical performance of a flying or floating recording head adjacent ta disk is measured in terms of the flying height or spacing between the head and the disk; the pitch angle or tilt of the head about an axis normal to the direction of relative motion between the disk and head; roll angle or tilt of the head about an axis along the direction of relative motion; approach angle of pitch during landing; mechanical resonance or other fluctuations of the recording head; and deformation of the recording head under the stresses imposed by the fluid film bearing and the mounting structure. It will be seen that all of these parameters are determinable from measurements of the spacing of selected points on the recording head from the surface of the disk. Thus, for example, pitch angle can be determined by measuring the spacing at the leading and trailing edges of the recording head together with knowledge of the length of the head. Similarly, roll angle is found by measuring the head to disk spacing at opposite side edges of the recording head.

In the past, in designing a new head for a magnetic disk memory system, limited computer simulation of the performance of the air bearing was used to approximate the geometry needed. This has been augmented by limited experimentation on a selected design with specially made heads having capacitive probes for measuring the disk to head space. This technique, however, is not completely satisfactory because the specially made heads rarely completely duplicate the actual head under development, and because in order to obtain the desired information a substantial number of probes within the dummy head were required. This technique also lacks a diagnostic capability in case it is found that production type heads are performing poorly.

It is, therefore, desirable that a technique be provided for measuring the mechanical performance of any recording head, whether one under development or a production head. It is also apparent that it is desirable to have such a technique suitable for other air bearings than those between a magnetic recording head and a recording disk, such as, for example, machine bearings, gyroscope bearings, or recording heads adjacent a magnetic recording drum.

BRIEF SUMMARY OF THE INVENTION

Thus, in practice of this invention according to a preferred embodiment, there is provided apparatus for evaluating a fluid film bearing having a relatively fixed member and a relatively movable member wherein a magnetic recording surface is provided on the fixed member and a magnetic transducer is provided on the movable member. Means are provided for recording a varying magnetic signal of known amplitude and wavelength on the recording surface and for reading the amplitude of magnetic signal sensed by the transducer while the two bearing members are in relative motion.

In a preferred embodiment, a transducer is mounted in a rotating disk so as to sweep across a recording head on which is deposited a magnetic recording surface. The transducer writes a magnetic signal on a path across the face of the recording head. The amplitude of signal is read across the recording head for measuring differences in spacing between the recording head and disk in various regions of the recording head.

DRAWINGS

These and other features and advantages of this invention will be appreciated as the same becomes better understood by reference to the following detailed description of a presently preferred embodiment when considered in connection with the accompanying drawings wherein.

Throughout the drawings like reference numerals refer to like parts.

DESCRIPTION

Figure 1:
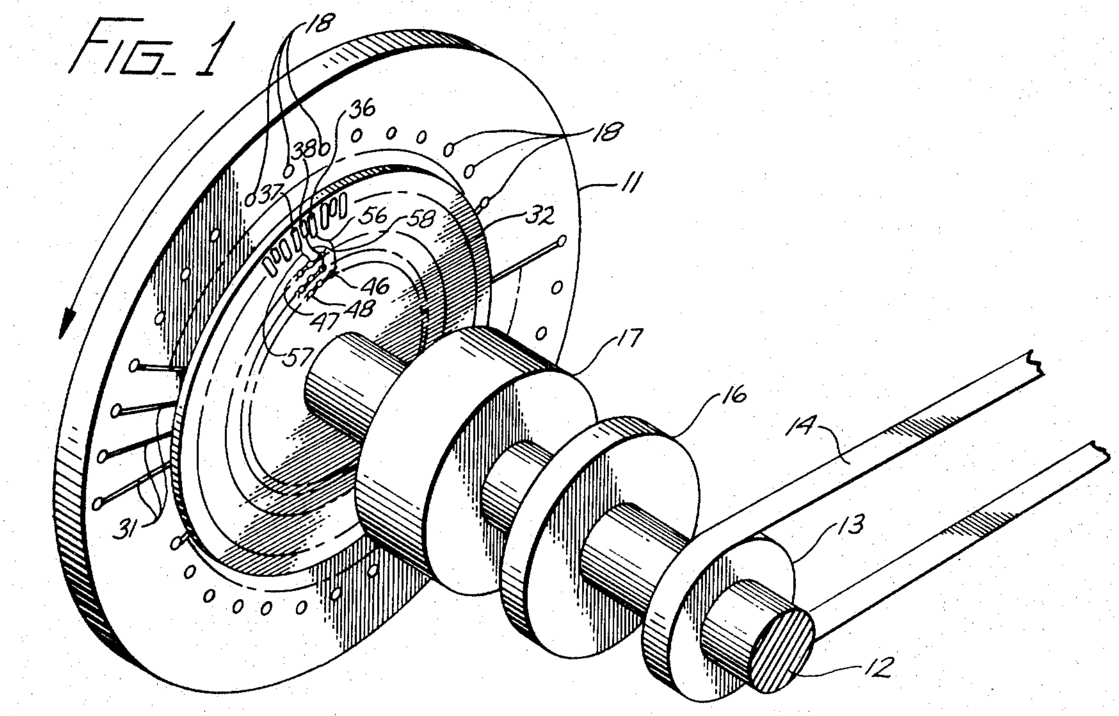
FIG. 1 illustrates in perspective a rotatable disk constructed according to principles of this invention.

FIG. 1 illustrates in perspective a specially instrumented disk constructed according to principles of this invention. As illustrated in this preferred embodiment, there is a rotatable metal disk 11 mounted on a shaft 12 which is, in turn, mounted on bearings (not shown) suitable for rapid rotation. For purposes of exposition the side of the disk seen in this view will be considered the back. A pulley 13 mounted on the shaft 12 is engaged by a drive belt 14 for rotating the assembly at high speed, typically 700 to 1,000 RPM. Mounted on the same shaft 12 is a conventional shaft position encoder 16 such as, for example, a photoelectric chopper for accurately monitoring shaft rotation for providing a signal to be employed as hereinafter described. A conventional slip ring assembly 17 is also mounted on the shaft for bringing three electrical leads from fixed instrumentation to the instrumented disk 11.

Mounted in the disk 11 are a plurality of magnetic transducer assemblies 18 with each of the transducer assemblies being on a different angular position on the disk and a different distance from the center of the disk than the other transducer assemblies so that collectively the transducer assemblies are in a spiral path extending along the face of the disk. The transducer assemblies are so arranged so that as the disk rotates the several transducer assemblies 18 travel in a series of concentric circles. The individual transducer assemblies are spaced apart circumferentially on the disk a sufficient distance that only one transducer assembly is adjacent a recording head being tested at any one instant of time. In the disk illustrated in FIG. 1, two spiral arrays of transducer assemblies are provided, each occupying approximately one half of the circumference of the disk. This is merely a matter of choice and a single spiral path, or even some other pattern which separates the transducer assemblies radially and circumferentially, can be employed.

Figure 2:
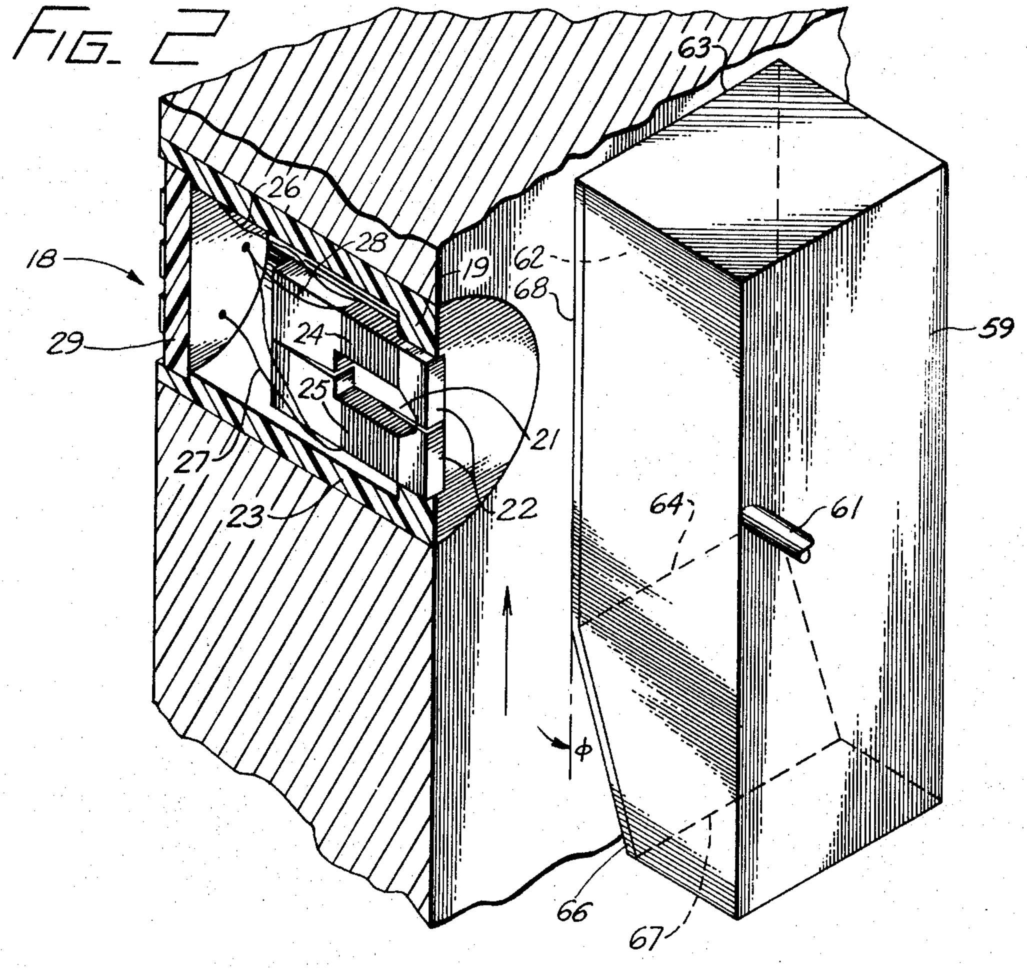
FIG. 2 illustrates in section a magnetic transducer in the disk of FIG. 1 and an adjacent recording head.

One of the transducer assemblies is shown in cross section in FIG. 2 with the back portion as seen in FIG. 1 being at the left side of the figure, that is the face of the disk seen in FIG. 2 is the front. It will be seen that the transducer assembly 18 extends substantially completely through the disk 11 so as to be adjacent both faces thereof.

The magnetic transducer assembly 18 includes a conventional magnetic core 19 which is a C-shaped assembly of two pieces of magnetic material having a non-magnetic shim 21 in the open part of the C to form what is known as a magnetic gap. In a typical embodiment, the width of the gap, that is the thickness of the shim, is in the order of 150 to 300 microinches. The pole pieces 22 of the core 19 adjacent the magnetic gap are in substantially the same plane as the face of the disk 11 so that a continuous smooth surface is presented thereon. The magnetic core 19 is held in place in the disk by being cemented within a right circular head cylinder 23 made of non-magnetic material.

A pair of coils 24 and 25 of insulated wire are wound on the opposite legs of the core 19 so that the two coils are in series between a first lead wire 26 and a second lead wire 27. Lead wires 28 are connected to the two coils 24 and 25 so as to form a "center tap" between the two coils. Such connection to the transducer coils is conventional, and in operation a current passed through the coil 24 between wires 26 and 28 induces magnetism or "writes" in one direction of polarization and current through the coil 25 between the wires 27 and 28 writes in the opposite magnetic polarization on a magnetic material placed adjacent the gap. When the transducer is employed for reading a magnetic field the signal induced in both coils, as sensed between wires 26 and 27, provides the output or read signal.

The wires 26, 27 and 28 are connected to a small conventional printed circuit board 29 adjacent the back face of the disk 11 so that electrical connection can be made to the magnetic transducer assembly.

Referring again to FIG. 1, wires (not shown) are connected to the three leads on the printed circuit board 29 in each transducer assembly 18. These wires are embedded in a groove 31 extending radially on the disk from each of the transducer assemblies 18 to a region beneath a circular printed circuit board 32 cemented to the back face of the disk. Three conventional connector pads 36, 37 and 38 are provided on the printed circuit board 32 adjacent each transducer 18 for connection to the leads 26, 27 and 28, respectively, (FIG. 2) of the magnetic transducer assembly by the wires (not shown) lying in the grooves 31 in the back face of the disk. Three concentric conductive rings 46, 47 and 48 are provided on the printed circuit board 32 and are, in turn, connected to the slip rings 17 so that electrical signals can be transmitted between the stationary portions of the apparatus and the instrumented disk 11. The innermost conductor ring 46 is connected to one or more of the connector pads 36 by a jumper wire 56 soldered, inserted, or clipped to the conductor and connector pad at each end. Likewise, the outer conductor ring 47 is connected to one or more connector pads 37 by a jumper wire 57, and the center ring 48 is connected by a jumper wire 58 to one or more of the connector pads 38 connected to the center tap wires 28 of the magnetic transducer assembly. As illustrated in FIG. 2, two such transducer assemblies 18 are so connected and it will be apparent that these transducer assemblies are therefore connected in parallel. If desired jumper wires can be employed between the respective connector pads of adjacent transducers for series connection.

Referring again to FIG. 2, a magnetic recording head 59 is arranged adjacent the front face of the recording disk 11 so that as the disk is rotated, the magnetic transducer assembly 18 is swept across the face of the recording head. The magnetic recording gap formed by the shim 21 is arranged normal to the direction of the travel of the disk adjacent the recording head. In FIG. 2, the recording head 59 is shown spaced a substantial distance from the surface of the disk; however, it should be realized that when the air bearing is active the recording head is actually in the order of about 100 microinches from the surface of the disk. The mounting arrangement for the recording head 59 is not illustrated since it is quite conventional, except to show schematically a piston 61 which is conventionally pneumatically operated to force the recording head towards the surface of the disk against the force exerted by a biasing spring (not shown) and the force of the air bearing between the stationary recording head and the rapidly rotating disk.

The magnetic recording head 59 has a plane surface 62, an edge of which is seen in the section of FIG. 2, which during normal operation of the head adjacent the rapidly moving disk is substantially parallel to the disk. In an operational head a plurality of magnetic transducers (not shown) are provided with magnetic gaps in the plane face 62. The face 62 has a trailing edge 63 and a leading edge 64. The head 59 also has a plane face 66, the trailing edge of which is coextensive with the leading edge 64 of the face 62. The second face 66 is angulated relative to the first face 62 by an angle $\phi$ which is conventionally in the order of only a few minutes of arc. The second face 66 also has a leading edge 67. In operation, as the disk 11 rotates rapidly, a thin film of air is swept along with it and enters the region between the face 66 and the surface of the disk and then proceeds into the space between the face 62 and the surface of the disk. These two surfaces, therefore, cooperate with the smooth front surface of the rapidly rotating disk to form an air bearing which is stable due to the arrangement of the two faces on the head.

In practice of this invention, the two faces 62 and 66 of the recording head 59 are coated with a thin layer 68 of magnetic recording material which is preferably a film of cobalt, cobalt-phosphorus, cobalt-nickel, or cobalt-nickel-phosphorus alloy having high magnetic coercivity. This is a conventional magnetic recording medium which is readily deposited on the surfaces by vacuum deposition or electroless deposition in a thickness in the order of about 10 to 20 microinches.

Figure 3:
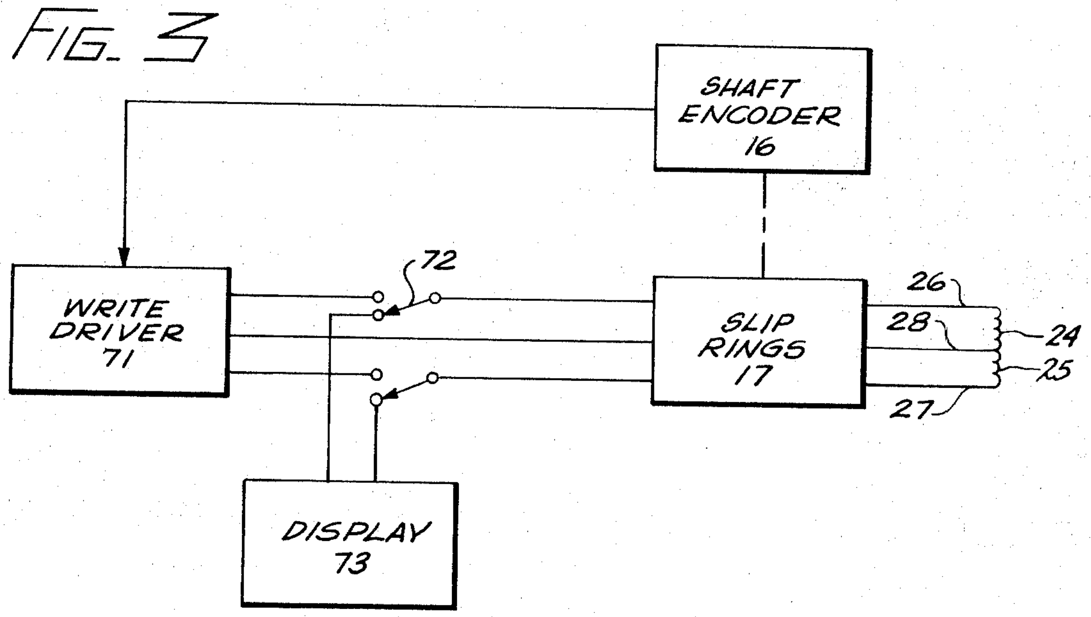
FIG. 3 is a block diagram of the measuring system.

Referring now to FIG. 3, the electrical connections are shown in block form for signals to and from the coils 24 and 25 of the magnetic transducer assembly 18 as carried by the slip rings 17. The three leads 26, 27 and 28 from the transducer are connected by way of the slip rings to a write driver 71. The center tap is permanently connected in series with both coils, and the other coil leads 26 and 27 are alternatively connected by a switch 72 with the write driver and with a display device 73 such as a conventional oscilloscope. The shaft encoder 16, which is mechanically coupled to the same shaft as the slip rings 17 and the disk 11 (FIG. 1) is coupled to the write driver so as to provide signals thereto indicative of rotation of the shaft.

The amplitude of a signal read from a magnetic recording medium by a transducer, such as hereinabove described and illustrated, is determined by the $A_1 = A_o e^{-2\pi d_1/\lambda}$ where $A_1$ is the signal amplitude read by a transducer a first distance $d_1$ from the recording medium, $A_o$ is the signal amplitude that would be obtained if the transducer were in contact with the recording medium, and $\lambda$ is the recorded wavelength of the magnetic signal on the recording medium. It will be noted that, from this formula, the read signal amplitude falls off exponentially with increasing distance d between the recording medium and the magnetic transducer. If the signal is not sinusoidal, the wavelength $\lambda$ is the apparent wavelength and this is readily found using a recording head having known characteristics in the air bearing.

It will also be noted that the absolute distance $d_1$ cannot be determined by a measurement of the amplitude $A_1$ if the amplitude $A_o$ with the transducer in contact with the recording medium is not known. In practical situations involving magnetic recording heads flying on air bearings adjacent a rotating disk, it is impractical to have the transducer in contact with the recording medium, and knowledge of $A_o$ is unavailable. It should also be noted, however, that when two amplitudes are measured with other conditions remaining constant, the formula reduces to $A_1/A_2 = e^{-2\pi(d_1-d_2)/\lambda}$, where $A_2$ and $d_2$ are the amplitude and spacing, respectively, of a second measurement made with the same transducer. It is assumed that the recorded wavelength $\lambda$ remains constant, while both amplitudes $A_1$ and $A_2$ are measured. Thus, when two amplitudes are measured, the difference in spacing between two different locations or times can be determined from measurements of only two amplitudes, and there is no requirement to measure the contact amplitude $A_o$.

The above mentioned formula for amplitude as a function of spacing between the transducer and recording medium ignores certain factors also affecting signal amplitude such as the properties of the magnetic recording film, gap length and the like. This is of no consequence, however, since the same transducer is employed for both writing and reading, the wavelength is kept constant, and variations in recording film properties are insignificant over the face of a recording head. Making relative readings of two amplitudes with conditions maintained constant cancels out the effect of other factors.

In operating the apparatus hereinabove described and illustrated, the disk 11 is rotated and a magnetic head 59 stabilized adjacent the surface of the disk on an air bearing. The shaft encoder 16 provides a train of signals indicative of the shaft rotation, and this train of signals is applied to the write driver 71 to apply writing current to the coils 24 and 25 of the magnetic transducer. The signal applied by the write driver is applied alternately to the two coils 24 and 25 so that the polarity of magnetization on the recording medium 68 on the recording head 59 rapidly reverses as a function of the angular position of the disk in a path lying along the face of the recording head. Since the recording is a function of angular position of the disk, a constant wavelength of recording is obtained, independent of disk speed of rotation. Recording can then be made with very close head to disk spacing. Wear is minimized since the head is essentially stationary and hardly any pressure is applied to the head.

It might be noted that the recording head 59 is essentially inert at this time, and the magnetic transducers thereof are not active. The test is not of the recording characteristics of the magnetic recording head 59 but is instead a measure of the spacing between the recording head and the disk.

The result of the writing cycle of operation is a line of signals of alternating polarity on the recording medium 68 along a path swept out by one of the transducer assemblies 18. When a plurality of such transducers are connected to the rings 46, 47 and 48, a plurality of concentric lines of signals are recorded on the faces of the recording head. If but a single transducer is employed on the disk a series of tracks can be provided on a recording head by sequentially indexing the head in a series of radial positions to obtain a series of lines of recorded signals.

Since the write driver is actuated by the shaft encoder 16, the wavelength of writing by the transducer on the magnetic medium on the recording head is completely independent of speed of rotation of the disk and, therefore, precise speed control is not required in order to obtain a constant recorded wavelength on the disk. Thus, for example, considering one path across the head, the recorded wavelength $\lambda$ at the leading edge 67, leading edge 64 and trailing edge 63 is constant. In a typical embodiment, the data is recorded at a density in the order of about 500 bits per inch which corresponds to a wavelength of about 0.004 inch since there are two bits per cycle or wavelength. By recording at very close spacing and low disk speeds the readback signal is primarily a function of the reading process with the important variable being spacing. The effects of spacing upon recording are minimized by employing a shaft encoder to make the wavelength independent of disk speed. This permits the recording head to be very close to the disk surface during recording.

Figure 4:
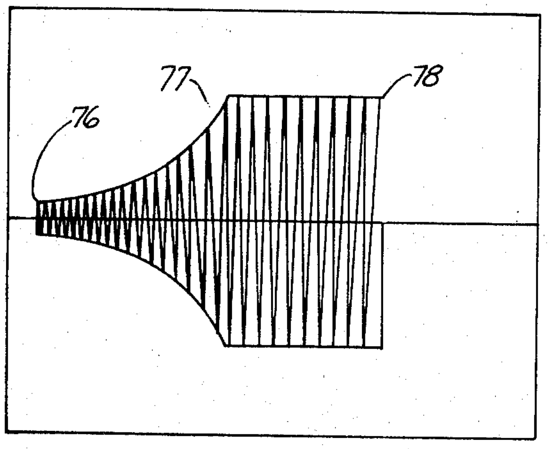
FIG. 4 is a typical output signal for a head flying parallel to the disk.
Figure 5:
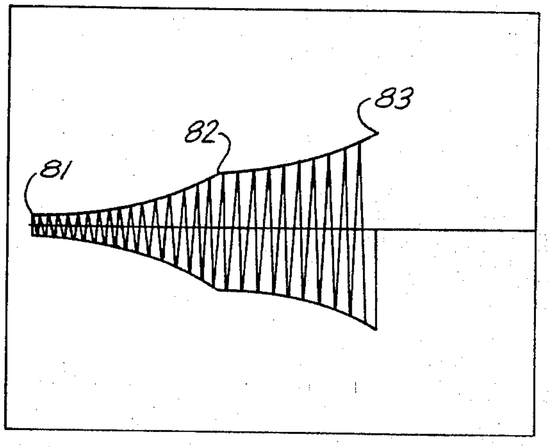
FIG. 5 is a typical output signal for a head flying pitched up relative to the disk.

After a line of signals has been recorded, the switch 72 is thrown so that the output signal from the transducer in the disk is displayed on the oscilloscope 73 for a ready measurement of signal amplitude. FIGS. 4 and 5 show typical oscilloscope traces, representative of magnetic signals recorded on a recording medium on a surface forming an air bearing adjacent a transducer in a rotating disk. In these traces, the signal amplitude is indicated on the vertical axis and time, or distance along the face of the head, is recorded proceeding left to right on the horizontal axis.

FIG. 4 illustrates a typical signal pattern when the air bearing is holding the surface 62 of the head substantially parallel to the surface of the disk. An initial signal 76 is seen as the leading edge 67 of the head passes over the gap of the magnetic transducer in the disk. This initial signal is of relatively low amplitude since the leading edge of the angulated face 66 is an appreciable distance from the transducer. As the transducer travels across the face of the head, the magnetic polarity recorded thereon rapidly reverses as indicated in the output signal trace of FIG. 4, and with constantly increasing amplitude until a point 77 is reached which corresponds to the position where the gap of the magnetic transducer is adjacent the leading edge 64 of the face 62 which is parallel to the surface of the disk. The signal amplitude then remains constant, since the spacing between the disk and recording medium is constant, until a point 78 is reached corresponding to the trailing edge 63 of the head, at which time the signal disappears. As the transducer travels between the leading edge 67 of the first face encountered and its trailing edge 64, the amplitude increases along an exponential path between the points 76 and 77 on FIG. 4 exactly as predicted from the equation $A = A_o e^{-2\pi d/\lambda}$.

FIG. 5 illustrates a typical oscilloscope trace wherein the recording head is pitched up at its leading edge so that the face 62 is not parallel to the surface of the disk, and its leading edge 64 is a greater distance from the surface of the disk than is its trailing edge 63. In this situation, the signal envelope from the recording medium on the head commences at a point 81 where the transducer gap is opposite the leading edge 67 of the head. The signal amplitude then increases exponentially to a point 82 corresponding to the trailing edge 64 of the first face or leading edge of the second face where a change in angle between the two faces occurs. From there on, the signal amplitude increases along a different exponential path to a point 83 corresponding to the trailing edge 63 of the head, at which time the signal ceases.

The angle of pitch of the recording head is determined by measuring the signal amplitude at the points 82 and 83 as shown on the oscilloscope trace of FIG. 5. This information corresponds to the values $A_1$ and $A_2$ in the equation $A_1/A_2 = e^{-2\pi(d_1-d_2)/\lambda}$. This equation can then be solved for $d_1$-$d_2$ so that the difference in spacing at the leading and trailing edges of the face can be determined. When the difference in spacing $d_1-d_2$ is known, the angle of pitch is readily found with the additional value of the distance between the leading edge 64 and trailing edge 63 of the recording head.

It will be apparent that the same technique can be employed for measuring the roll angle of the magnetic recording head by measuring the amplitudes along opposite side edges of the recording head and finding the distance difference at the two sides. Similarly, deformation of the flat surface 62 such as, for example, under the stresses imposed on the head between the air bearing and the piston 61 can be found by measuring the amplitude at a series of points on the face of the recording head.

Since it may be desirable to obtain pitch and roll angles and also deformation on a head with given mounting parameters, a plurality of recording transducers 18 are provided on the face of the instrumented disk 11. These transducers are arranged at different radial spacings so as to sweep out concentric paths on the face of a recording head, and they are also spaced circumferentially on the disk by a distance sufficient that only one transducer assembly is adjacent the recording head at any one time. Thus, as the disk rotates, a signal envelope such as illustrated in FIGS. 4 or 5 is obtained from one transducer as it traverses the recording head, then the next transducer following a parallel path, and so on, across the face of the recording head. It will be apparent that when a plurality of transducer assemblies are employed at one time, a simple oscilloscope is not suitable for displaying the amplitude envelopes which follow in close sequence and it is preferred to record the envelopes in some other manner for display or measurement at a later time.

It will also be apparent that instead of measuring the amplitude envelope on an oscilloscope trace, the amplitude can be measured and processed in a computer in near real time in order to obtain a best fit of the measured exponential by changing amplitude to the aforementioned equation so that the spacings are rapidly obtained and with somewhat higher precision than may be obtained by measuring two points at ends of the exponential curve.

It will also be apparent that although the technique has been described in relation to a magnetic recording head for a disk memory system that the same technique is applicable to other fluid film bearings where a magnetic recording medium can be provided on one bearing surface and a transducer provided on the other bearing surface. Capacitive probes can be placed in the disk, however, these are noticeably inferior since they are large relative to the magnetic signals recorded and lack the resolving power of the above described magnetic technique.

What is claimed is:

1. In an apparatus for measuring relative thickness of a fluid film bearing between a rotatable member having a first fluid film bearing surface and a stationary inactive or simulated recording head having a second fluid film bearing surface and a recording medium on the head bearing surface the improvement comprising:
- means for mounting a stationary inactive or simulated recording head adjacent the rotatable member;
- means for rotating the rotatable member;
- a magnetic transducer in the rotatable member and adjacent the fluid film bearing surface thereof;
- means for applying a cyclically varying write signal of known wavelength by way of the magnetic transducer to the recording medium on the stationary inactive or simulated recording head while the rotatable member is rotating;
- means for receiving a read signal from the transducer while the rotatable member is rotating; and
- means for measuring the amplitude of the read signal as a function of time.

2. An apparatus as defined in claim 1 wherein the rotatable member comprises a disk having a magnetic transducer adjacent one face thereof.

3. In an apparatus for measuring relative thickness of a fluid film bearing between a rotatable member having a first fluid film bearing surface, and a stationary inactive or simulated recording head having a second fluid film bearing surface and a recording medium on the head bearing surface the improvement comprising:
- means for mounting a stationary inactive or simulated recording head adjacent the rotatable member;
- means for rotating the rotatable member;
- a magnetic transducer in the rotatable member and adjacent the fluid film bearing surface thereof;
- means for sensing rotational position of the rotatable member;
- means responsive to the means for sensing for applying a cyclically varying write signal of known wavelength by way of the magnetic transducer to the recording medium on the stationary inactive or simulated recording head while the rotatable member is rotating;
- means for receiving a read signal from the transducer while the rotatable member is rotating; and
- means for measuring the amplitude of the read signal as a function of time.

4. A method for evaluating a fluid film bearing between a first member and a second member movable relative to each other comprising the steps of:
- recording magnetic signals of known wavelength $\lambda$ on the first member;
- reading a first signal amplitude $A_1$ at a first point on the first member with a magnetic transducer mounted in the second member;
- reading a second signal amplitude $A_2$ at a second point on the first member with the same magnetic transducer; and
- determining the difference in fluid film thickness at the first point and the second point from the equation $A_1/A_2 = e^{-2\pi(d_1-d_2)/\lambda}$, where $d_1-d_2$ is the difference in fluid film thickness at the first and second points, respectively.

5. A method as defined in claim 4 wherein the fluid film bearing is between a recording head and a rapidly rotating disk comprising the additional steps of:
- providing a magnetic recording medium on the bearing face of the recording head; and
- reading the magnetic signal amplitudes with a magnetic transducer mounted in the disk.

6. An apparatus for measuring the flying characteristics of a recording head adjacent a rapidly rotating disk comprising:
- a rotatable disk having at least one smooth face;
- means for rotating the rotatable disk;
- a recording head adjacent a face of the disk and adapted to form a fluid film bearing between a bearing surface of the recording head and the smooth face of the disk;
- a magnetic recording medium on the bearing surface of the recording head;
- a magnetic transducer mounted in the disk and having a magnetic gap adjacent the smooth face of the disk;
- means for sensing disk rotation and providing output signals indicative of disk rotation;
- write driver means coupled to the means for sensing and to the transducer for applying varying signals to the transducer responsive to shaft rotation for applying varying magnetic signals of known wavelength to the magnetic recording medium on the bearing surface of the recording head;
- means for transmitting signals to and from the transducer while the disk is rotating; and
- means for receiving signals sensed by the transducer from the recorded signals on the magnetic medium and for indicating amplitude of the sensed signals.

7. An apparatus as defined in claim 6 further comprising:
- a plurality of magnetic transducers on the disk an having their respective magnetic gaps on the smooth face of the disk, each of the transducers being on a different radius from other of the transducers and being a different distance from the center of the disk than other of the transducers for sweeping separate concentric paths across the magnetic medium as the disk rotates and for sequentially sweeping across the paths one after another.

8. A combination comprising:
- a rotatable disk;

a plurality of magnetic transducers in the disk, each having a magnetic gap adjacent the face of the disk, said transducers each being at a different angular position on the disk from the other transducers and at a different distance from the center of the disk from the other transducers;

means for conducting write and read signals to and from the transducers;

means for rotating the disk;

means for applying a cyclically varying write signal of known wavelength to the transducers while the disk is rotating;

means for receiving a read signal from the transducers while the disk is rotating; and means for measuring the amplitude of the read signal as a function of time.

9. A combination as defined in claim 8 wherein the plurality of transducers are arranged in a spiral path on a face of the disk.

10. A combination as defined in claim 8 further comprising means for selectively and alternatively connecting said transducers in series with each other and in parallel with each other.

11. A combination as defined in claim 10 wherein the means for connecting comprises:

a non-conductive substrate connected to one face of the disk;

a plurality of conductive areas on the substrate;

means for connecting three of said conductive areas with each of the transducers;

three conductive paths on the substrate;

means for selectively interconnecting conductive areas associated with one transducer with corresponding conductive areas associated with a second transducer for connecting the transducers in series, or connecting the conductive areas associated with a plurality of transducers with selected ones of the conductive paths for connecting the transducers in parallel.

* * * * *